May 14, 1968  A. G. FERRARI  3,382,535
MINIMUM LENGTH EXTRUSION DIE
Filed April 16, 1965  3 Sheets-Sheet 1
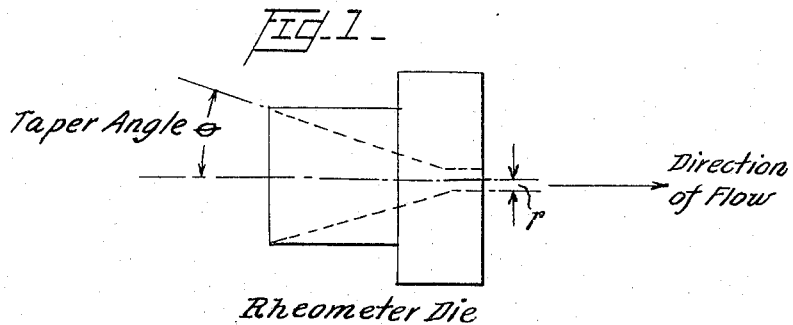
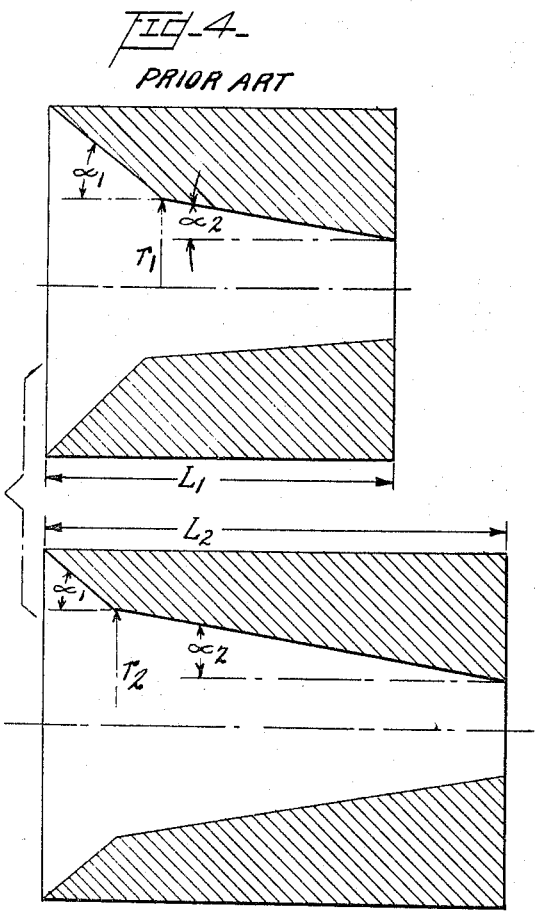
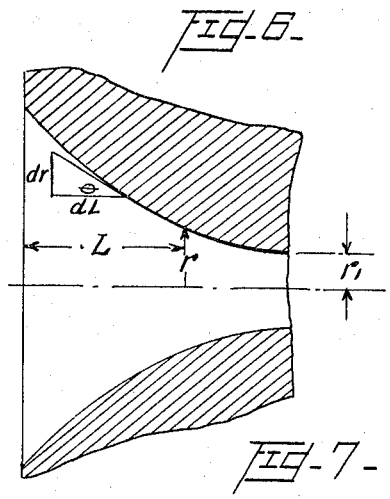
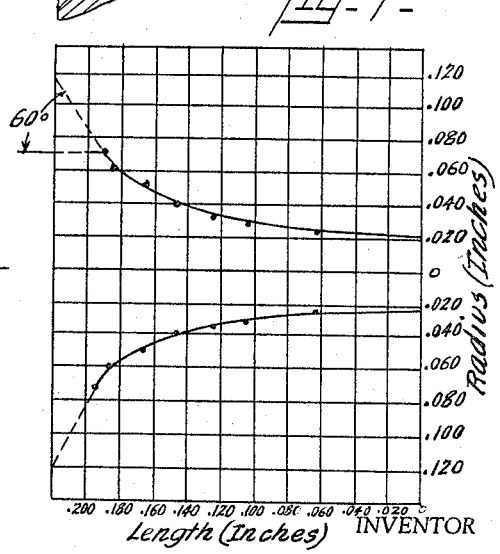
INVENTOR
A. G. Ferrari,
BY R. P. Miller
ATTORNEY

FIG. 8

Table 1 - Polypropylene at 190°C.

| Taper Angle | Extrusion Rate (in³/sec.) | Critical Shear Rate (Sec.⁻¹) | Minimum Radius (Inches) at q = .152 in³/sec. |
|---|---|---|---|
| 90° | .010 | 480 | .074 |
| 45° | .014 | 660 | .067 |
| 22.5° | .032 | 1500 | .051 |
| 10° | .149 | 7000 | .031 |
| 6° | .305 | 14400 | .024 |
| 3° | .372 | 18000 | .022 |

FIG. 9

Table 2.

| Points | Minimum Radius (Inches) | Taper Angle (Degrees) |
|---|---|---|
| 1 | .033 | 10 |
| 2 | .061 | 40 |

FIG. 10

Table 3.

| | Radius r (Inches) | Length L (Inches) |
|---|---|---|
| Exit Radius | .022 | 0 |
| | .025 | .061 |
| | .030 | .102 |
| | .035 | .123 |
| | .040 | .143 |
| | .050 | .165 |
| | .060 | .183 |
| Entrance Radius | .070 | .189 |

United States Patent Office 3,382,535
Patented May 14, 1968

1

3,382,535
MINIMUM LENGTH EXTRUSION DIE
Armando G. Ferrari, Trenton, N.J., assignor to Western Electric Company, Incorporated, New York, N.Y., a corporation of New York
Filed Apr. 16, 1965, Ser. No. 448,807
3 Claims. (Cl. 18—12)

ABSTRACT OF THE DISCLOSURE

A minimum length extrusion die having a smooth internal contour for extruding, without melt fracture, plastic materials which are sensitive to die taper angles. The internal contour of the die varies from the exit to the entrance in accordance with an equation which is related to the critical shear rate of any selected plastic material, the minimum die radius and the die taper angle.

---

This invention relates to plastic material extrusion dies and, more particularly, to a minimum length extrusion die having a predetermined internal contour for extruding plastic material without extrudate roughness.

In the design of dies for extruding plastic material, consideration must be given to overcoming the problem of the formation of undesirable undulating peripheral surfaces which are the result of a condition known as melt fracture. It is well known that melt fracture or extrudate surface roughness may be reduced by decreasing the extrusion rate or by designing dies having long, gently tapered die chambers or throats. However, it is rarely advantageous to decrease the extrusion rate. Furthermore, it is not always practical or desirable to utilize long dies. For example, since the viscous drag on a wire is directly proportional to the length of a die, short dies permit the extrusion of plastic material on wire having a relatively low tensile strength. Furthermore, short dies reduce the problems of centering and aligning which are prevalent in long dies. For another example, consider a multi-layer extrusion situation where a first extruded layer is an expanded foam plastic that is extruded on a moving wire. The foam plastic does not begin to expand until the wire passes out of a first die, and into a second die where a second solid layer of plastic is extruded over the first expanding foam layer. Here, the length of the first die should be as short as possible to preclude premature expansion of the foam plastic before the foam plastic coated wire advances into the second die. When the first coated wire immediately enters the second die, the second die in combination with the extruded second solid plastic sheath exerts a pressure that functions to prevent further expansion of the first foam plastic layer. The second die should also be as short as possible in order to reduce aligning and centering problems. Therefore, if both dies are short and close together, smooth sheaths of uniform thickness can be successively extruded on the advancing wire.

It may be appreciated, in the last mentioned example, that it is necessary (1) that the extruded sheaths of foam and solid plastics are free from melt fracture thus indicating the need for long tapered dies, and (2) that the second sheath is immediately extruded on the first sheath before foaming of the first sheath is completed thus indicating the need for short, closely spaced dies. It is therefore manifest that opposing design requirements are present. More particularly, the die should be as short as possible for foaming, aligning, and centering reasons, yet it should also be long with gently tapered surfaces to eliminate melt fracture or extrudate roughness.

An object of the present invention is to provide a new and improved plastic extrusion die.

2

Another object of the invention is to provide a minimum length die for extruding plastic materials that are responsive to die taper angles.

An additional object of this invention is to provide an extrusion die wherein plastic material may be extruded through a die of minimum length without encountering detrimental extrudate roughness.

It is another object of this invention to provide an extrusion die which optimizes a combination of a minimum die length and a smooth internal contour to reduce ex-extrudate roughness in plastic materials responsive to die taper angles.

With these and other objects in view, the present invention contemplates an extrusion die that provides a minimum length die having an internal contour for extruding plastic material without melt fracture. A laboratory rheometer is used to establish the shear rate at which extrudate roughness or melt fracture occurs. In certain polymers, this shear rate, called the critical shear rate, depends strongly on the die taper angle. By using a series of dies having different taper angles, this functional dependence can be determined. The shear rate can also be expressed by a relationship involving only the extrusion rate and the radius of the die orifice. By utilizing these relationships, shear rate to taper angle and shear rate to radius, the minimum allowable radius for any taper angle can be ascertained, and a minimum length extrusion die having a smooth contour can be fabricated.

Other objects and advantages of the present invention will become apparent from the following detailed description when considered in conjunction with the accompanying drawings, wherein:

FIG. 1 is a side view of a rheometer die showing direction of extrudate flow, taper angle $\theta$ and exit radius $r$;

FIG. 4 is a diagram illustrating a comparison of two double taper dies showing that the length of a die is dependent upon the radius to the juncture of the tapers;

FIG. 6 is a cross-sectional view of a minimum length extrusion die having a smooth internal contour for extruding materials sensitive to die taper angle in accordance with the principles of the present invention;

FIG. 7 is a plot showing a minimum length extrusion die having a smooth internal contour for extruding polypropylene in accordance with the principles of this invention;

FIG. 8 is a table showing the values of extrusion rate, critical shear rate, and minimum radius with respect to different taper angles for extruded polypropylene;

FIG. 9 is a table showing the values of minimum radius and taper angle at selected points on the FIG. 5 plot; and FIG. 10 is a table showing the values of minimum radius and length used to plot the die shown in FIG. 7.

Considering first the problem of melt fracture in extruded plastics, the onset of melt fracture in certain materials, such as polypropylene, high density and low density polyethylene, together with their copolymers, is influenced by the taper angle of the extrusion die. In determining the quantitative effect of the taper angle on melt fracture, plastic material is extruded through a series of dies having different taper angles which are individually placed in a heated laboratory rheometer such as that described by E. H. Merz and R. E. Colwell in an article entitled, "High Shear Rate Capillary Rheometer for Polymer Melts," in American Soc. Testing Materials, bulletin No. 232, page 63, September 1958.

Although the rheometer extrudes a rod of plastic material through a die, rather than extruding a sheath of plastic material over a wire, the results are considered comparable since the addition of wire to the system tends to increase the ability of the plastic material to withstand melt fracture.

In using the laboratory rheometer, one of the series of dies, as shown in FIG. 1, having a specific taper angle $\theta$ is inserted into the rheometer and heated plastic material is forced through the die at a specific extrusion rate. The extrusion rate is then increased in incremental steps until waviness occurs in the extrudate. This waviness is indicative of the onset of melt fracture. Generally, the extrusion rate at which extrudate waviness or melt fracture occurs is quite sharp and easily discernible. When the point of melt fracture is reached, the specific extrusion rate is recorded, and another die, having a different taper angle, is inserted into the rheometer. Then the above steps are repeated until the extrusion rate at which melt fracture occurs is recorded for each of the different taper angles.

The critical shear rate $S_c$, which is the shear rate at which melt fracture occurs, is then calculated by the following relationship:

$$(1) \qquad S_c = \frac{4q}{\pi r^3}$$

where $q$ equals the recorded extrusion rate at which melt fracture occurs, and $r$ equals the known exit radius of the orifice of the rheometer die, as shown in FIG. 1.

Figure 2:
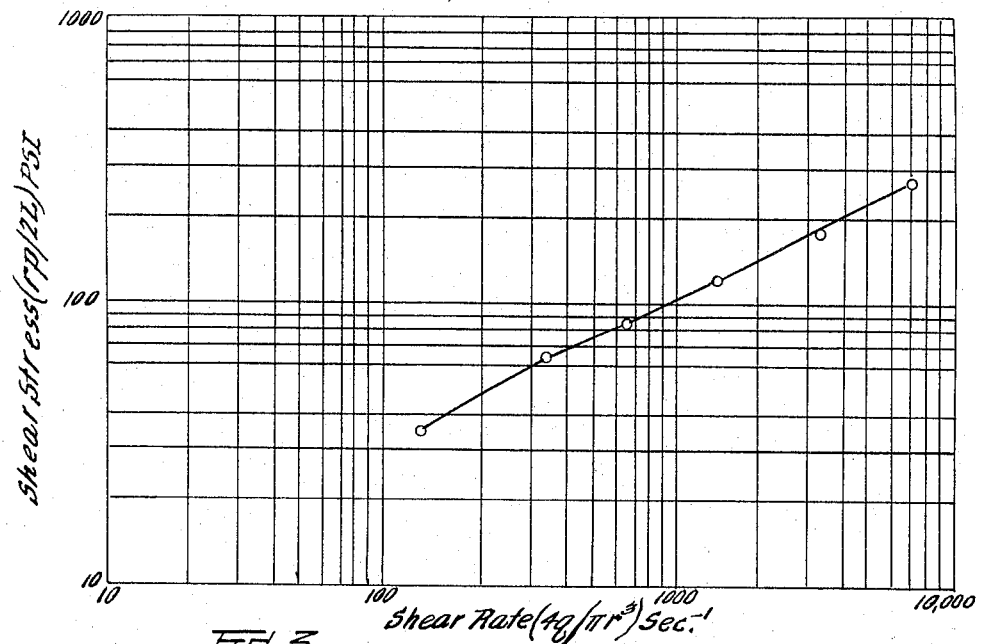
FIG. 2 is a plot of the shear stress as a function of the shear rate for extruded polypropylene.

This relationship is only an approximation, however, since the fluid under consideration, a viscous melt, is non-Newtonian. A more precise relationship is given by:

$$(2) \qquad S_c = \frac{(3n'+1)}{4n'} \cdot \frac{4q}{\pi r^3}$$

where $n'$ is the slope of the shear stress-shear rate curve (FIG. 2) at the point of interest. Essentially $n'$ measures the degree of non-Newtonianess of a given fluid and is usually about .5 for most polyolefin melts. Hereinafter $n'$ is referred to as the non-Newtonianess factor. The shear stress-shear rate curve shown in FIG. 2 is obtained by measuring the force required to extrude a plastic material through a laboratory rheometer at a given extrusion rate. Then using the relationships:

$$(3) \qquad \text{Shear stress} = \frac{rp}{2L_r}$$

where $r$ is the exit radius of the rheometer die, $p$ is the measured force, and $L_r$ is the length of the rheometer die, and $$(4) \qquad \text{Shear Rate} = \frac{4q}{\pi r^3}$$

where $q$ is the given extrusion rate and $r$ is the exit radius of the rheometer die, a curve can be plotted such as shown in FIG. 2. The non-Newtonianess factor can then be determined from the slope of this curve. All values of shear stress are extrapolated to zero length of the rheometer barrel since there is a resistance to the flow of plastic material within the rheometer barrel.

Since Equation 2 is a more precise relationship, it is used hereinafter instead of Equation 1. Nevertheless, Equation 1 may be used in place of Equation 2 with only a slight loss of precision. Of course, if the extruded plastic material is a Newtonian fluid, then the non-Newtonianess factor, $n'$, equals one and Equation 1 equals Equation 2.

Figure 3:
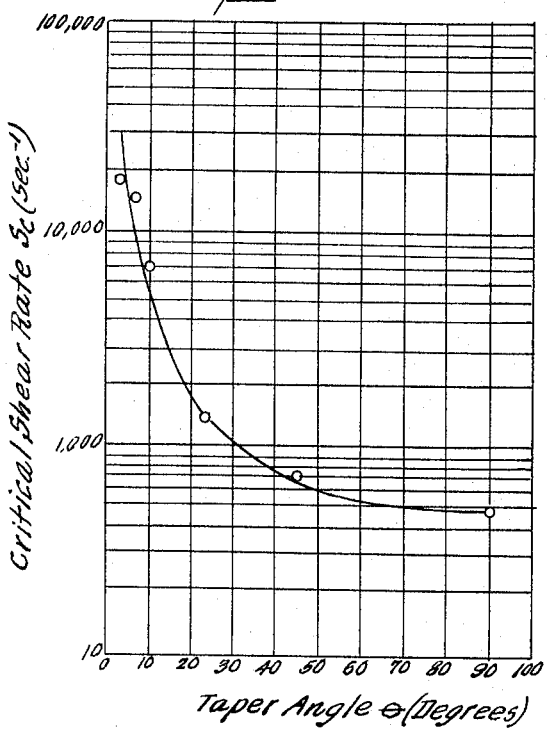
FIG. 3 is a plot of the critical shear rate as a function of the taper angle for extruded polypropylene.

After calculating the critical shear rate $S_c$ from Equation 2, a curve is plotted of the critical shear rate as it varies with the different selected taper angles. FIG. 3 is an illustration of such a curve.

To determine the relationship between the radius of a die and the critical shear rate, Equation 2 is solved for $r$ to obtain:

$$(5) \qquad r = \left[\frac{4q}{\pi S_c} \cdot \left(\frac{3n'+1}{4n'}\right)\right]^{1/3}$$

Thus, for some given extrusion rate $q$, $r$ is seen to be a function of the critical shear rate $S_c$, which in turn is a function of the taper angle $\theta$, as illustrated in FIG. 3. The critical shear rate $S_c$ corresponds to the maximum shear rate where smooth extrudate is observed, and $r$ is the minimum radius for smooth output at a particular taper angle. Therefore, Equation 5 sets forth the minimum radius of a die as a function of its shear rate which in turn is a function of the taper angle for a particular constant extrusion rate. For the purpose of illustration, refer now to FIG. 4 where two double taper dies are shown, each having two tapers of $\alpha_1$ and $\alpha_2$. Note the radius at the point where the two tapers meet. The radius $r_1$ is smaller than the radius $r_2$ and consequently the length $L_1$ is less than the length $L_2$. Thus, in order to keep the length of a double taper die as short as possible, the radius at the juncture of the two tapers should be as small as possible. However, the radius is limited because a radius which is too small results in the occurrence of melt fracture or extrudate roughness. Equation 5 defines the minimum radius which can be used.

The particular value of the extrusion rate $q$ which is to be inserted into Equation 5 is dependent upon and determined by the manufacturing requirements involved, that is, the cross-sectional area of the extrudate and the rate at which it is desired to extrudate. For example, for a .044 inch diameter solid rod of plastic wire running at 500 feet per minute, $$q = .152 \frac{\text{in.}^3}{\text{sec.}}$$

For the same wire running at 1000 feet per minute, $$q = .304 \frac{\text{in.}^3}{\text{sec.}}$$

Figure 5:
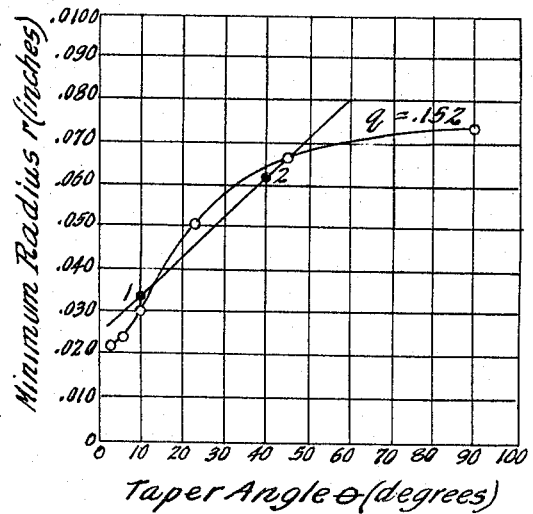
FIG. 5 is a plot showing the relationship between the minimum radius of a die with respect to the taper angle for polypropylene extruded at a constant extrusion rate.

Inasmuch as the extrusion rate $q$ is fixed by the particular manufacturing requirements, the critical shear rate $S_c$ for each taper angle may be determined from Equation 2 or from the curve of the critical shear rate versus the taper angle (FIG. 3) and inserted into Equation 5 to provide the minimum radius that can be utilized with a specific taper angle without resulting in melt fracture at the particular extrusion rate. A curve of the minimum radius as it varies with the taper angle $\theta$ is then plotted, as illustrated in FIG. 5.

Since increasing the number of tapers on a die, such as that shown in FIG. 4, tends to decrease its length, utilizing an infinite number of tapers, each with a minimum radius, results in the construction of a minimum length die. Referring now to FIG. 6, it can be shown that the radius at any point on a die having an infinite number of tapers or a smooth curve is a function of the tangent to the curve at that point.

More particularly, considering $r$ as the independent variable, $$(6) \qquad \frac{dL}{dr} = \text{cotangent } \theta$$

Integrating, $$(7) \qquad L = \int_{r_1}^{r} \cot \theta \, dr$$

However, the radius $r$ is a function of the critical shear rate $S_c$ and hence a function of the taper angle $\theta$ as shown in Equation 5 and conversely $\theta$ is a function of $r$. Therefore, Equation 7 becomes:

$$(8) \qquad L = \int_{r_1}^{r} \cot f(r) \, dr$$

When $f(r)$ is higher than first order, such an integral is usually approximated by either a graphical method or by a series expansion method. However, to facilitate the solution of Equation 8, a first order equation of the function $f(r)$ can be approximated by fitting a straight line to the curve of the radius as it varies with the taper angle, as illustrated in FIG. 5, between, for example, $\theta$ greater than 0° but less than or equal to 60°. The equation of the straight line thus fitted, hereinafter called the "extrudate characteristic line," is:

(9) $$\theta = ar + b$$

where $a$ and $b$ are constants. The constants $a$ and $b$ are, respectively, the slope constant and the intercept constant of the extrudate characteristic line. The values of the slope constant $a$ and the intercept constant $b$ are ascertained by selecting two points along the extrudate characteristic line and inserting the corresponding coordinates of the two points into Equation 9 and solving the two equations simultaneously.

Upon substituting Equation 9 into Equation 7,

(10) $$L = \int_{r_1}^{r} \cot(ar+b)\,dr$$

Integrating Equation 10:

(11) $$L = \frac{1}{a} \ln\left[\frac{\sin(ar+b)}{\sin(ar_1+b)}\right]$$

where $r$ is any radius along the length of the die, $L$ is the axial distance measured from the exit of the die to the radius $r$, $r_1$ is the exit radius, $a$ is the slope constant of the extrudate characteristic line, and $b$ is the intercept constant of the extrudate characteristic line. The exit radius $r_1$ is determined by the manufacturing requirements. For example, if an .020 inch diameter wire is covered with two coatings each having a thickness of .006 inch then the total diameter of the wire and coatings is .044 inch which means that the exit diameter of the die must be .044 inch. Hence, the exit radius is .022 inch. The entrance radius is determined from the curve of radius versus taper angle (such as shown in FIG. 5) after selecting a particular entrance angle. A 60° entrance angle is generally selected as being the widest entrance angle that can be utilized for satisfactory results. However, larger entrance angles may be used, but this is usually not advisable since it results in a sharp corner in the die holder which tends to hold-up plastic material.

Once the entrance radius is selected, Equation 11 is used to determine the overall length of the die by setting $r$ equal to the known entrance radius and $r_1$ equal to the known exit radius. Since the entrance radius and the exit radius are respectively the largest and the smallest radii along the die, the contour of the die can be plotted by substituting values of $r$ between the entrance radius and the exit radius into Equation 11 and solving for $L$. Thus, Equation 11 defines the inner contour of a minimum length extrusion die for extruding plastic material without extrudate roughness or melt fracture.

It is to be noted that Equation 11 is an approximation and that a more exact relationship is given by Equation 8 which can be solved by a graphical or series expansion method. It is to be further noted that the value of the critical shear rate $S_c$ changes for different plastic materials, temperatures, and extrusion rates. Hence, any deviation in one or more of these three parameters necessitates that new curves be plotted, as hereinabove described.

The following example is included to further illustrate various aspects of the present invention.

Example 1. — Polypropylene (ASTM D1238–57T; $I_2 = 230°$ C., 2160 G load), heated to 190° C., was extruded through a series of dies in a laboratory rheometer. The dies had taper angles varying from 3° to 90° and each had an exit diameter of .030 inch. The critical shear rate for each taper angle was determined by extruding the polypropylene through a die and increasing the extrusion rate incrementally until extrudate roughness was visible. This extrudate roughness indicated that the critical shear rate was reached. The values of extrusion rate at which the extrudate roughness occurred for each taper angle is recorded in Table 1, shown in FIG. 8.

The critical shear rate $S_c$ for each taper angle was than calculated by substituting the corresponding extrusion rate $q$ into Equation 2

$$S_c = \frac{4q}{\pi r^3} \cdot \frac{(3n'+1)}{4n'}$$

The calculated values of the critical shear rate for each taper angle are also shown in FIG. 8, Table 1. Next, a curve of the critical shear rate as it varies with the taper angle was plotted, as shown in FIG. 3, from the data in Table 1.

Since design conditions for this example determined that the wire to be coated is to move at 500 feet per minute, and that the final diameter of the wire and the polypropylene is to be .044 inch, the extrusion rate $q$ was calculated to be .152 cubic inch per second. This value of extrusion rate $q$ was inserted into Equation 5 and the minimum radius was determined for each value of the critical shear rate. These calculated values of minimum radius are also shown in Table 1. Next, a curve of the minimum radius versus the taper angle was plotted, as shown in FIG. 5, from the data recorded in Table 1.

A straight line was then fitted to the FIG. 5 curve between 3° and 60°. Two points, 1 and 2, were selected on the straight line and the corresponding coordinates of radius and taper angle for each point were recorded as shown in FIG. 9, Table 2.

The data recorded in Table 2 was then inserted into Equation 9 $\theta = ar + b$, and the two equations were solved simultaneously to determine that constant $a$ equals 1.02 and constant $b$ equal 20.5. The values of constants $a$ and $b$ were converted into radians and both $a$ and $b$ were then inserted into Equation 11. For this example then, Equation 11 becomes particularly $$L = 56.5 \ln\left[\frac{\sin\left(\frac{r}{56.5} - .363\right)}{\sin\left(\frac{r_1}{56.5} - .363\right)}\right]$$

where $r_1$ is the exit radius (.022 in.) and $r$ is any radius along the length of the die. The equation was solved for a plurality of different radii $r$ between the entrance radius .070 (minimum radius for a 60° taper angle) and the exit radius $r_1$ .022. These calculated values are shown in FIG. 10, Table 3. From the data recorded in Table 3, the internal contour of a minimum length extrusion die was plotted as shown in FIG. 6. Then an extrusion die was constructed to conform to this plot.

It is to be understood that the above-described example is merely illustrative of an application of the principles of the invention, and many other modifications may be made without departing from the invention.

What is claimed is:

1. A minimum length die for the smooth extrusion of a plastic material sensitive to die taper angles comprising a die having an internal contour determined by the equation $$L = \frac{1}{a} \ln\left[\frac{\sin(ar+b)}{\sin(ar_1+b)}\right]$$

where:
  $r_1$ is the exit radius of the die;
  $r$ is the radius at a given point along the die;
  $L$ is the axial distance from the die exit to said given point;
  $a$ is the slope constant of the extrudate characteristic line for said plastic material at a predetermined extrusion rate and a predetermined temperature; and
  $b$ is the intercept constant of the extrudate characteristic line for said plastic material at said predetermined extrusion rate and said predetermined temperature.

2. A minimum length extrusion die for extruding plastic materials sensitive to die taper angles comprising a die member having an inner contour determined by the equation $$L \int_{r_1}^{r} \cot f(r) dr$$

where:
$r_1$ is the predetermined exit radius of said die,
$r$ is the radius of said die at any given point and
$L$ is the axial distance from the exit of said die to said given point and
$f(r)$ is the equation of the curve of the minimum radius versus the taper angle for said plastic material, said curve being established by the relationship $$r = \left[ \frac{4q}{\pi S_c} \left( \frac{3n'+1}{4n'} \right) \right]^{1/3}$$

where:
$n'$ is the non-Newtonianess factor of said plastic material,
$q$ is a preselected constant extrusion rate and
$S_c$ is the critical shear rate of said plastic material, said critical shear rate $S_c$ having a different value for each different taper angle, said different values established by extruding said plastic material at a predetermined temperature through a series of dies each having a different taper angle.

3. A minimum length extrusion die for extruding plastic materials sensitive to die taper angles, comprising a die member having an inner contour varying from the die exit to the die entrance in accordance with the integral of the relationship $$\frac{dL}{dr} = \cot f(r)$$

where:
$r$ is the radius of the die member at any given point,
$L$ is the axial distance from the exit of said die member to said given point, and
$f(r)$ is the equation of the curve of the minimum radius as it varies with the taper angle for said plastic material.

References Cited

UNITED STATES PATENTS

| | | | |
|---|---|---|---|
| 1,862,947 | 6/1932 | Smith et al. | 18—13 X |
| 1,934,647 | 11/1933 | State et al. | 18—12 X |
| 2,572,677 | 10/1951 | Tench | 18—12 |
| 2,750,034 | 6/1956 | Gersman | 18—12 X |
| 3,196,486 | 7/1965 | Shesler et al. | 18—12 |
| 3,267,518 | 8/1966 | Juel et al. | 18—12 |

OTHER REFERENCES

Rubber World: "Applying Rheological Data to the Design of Rubber Extrusion Dies, Part 2," pp. 49–52, November 1963.

WILLIAM J. STEPHENSON, *Primary Examiner.*

UNITED STATES PATENT OFFICE
CERTIFICATE OF CORRECTION

Patent No. 3,382,535            May 14, 1968

Armando G. Ferrari

It is certified that error appears in the above identified patent and that said Letters Patent are hereby corrected as shown below:

Column 6, lines 7 to 9, the portion of equation 2 reading "4g" should read -- 4q --.

Signed and sealed this 16th day of December 1969.

(SEAL)
Attest:

Edward M. Fletcher, Jr.            WILLIAM E. SCHUYLER, JR.
Attesting Officer                  Commissioner of Patents